United States Patent
Campbell et al.

(10) Patent No.: US 6,908,106 B2
(45) Date of Patent: Jun. 21, 2005

(54) INFLATOR

(75) Inventors: Douglas P. Campbell, Metamora, MI (US); Ahmad K. Al-Amin, Higley, AZ (US); Timothy A. Swann, Mesa, AZ (US); Roy D. Van Wynsberghe, Mesa, AZ (US); Jess A. Cuevas, Scottsdale, AZ (US); Dean M. Esterberg, Tempe, AZ (US); Bryan W. Shirk, Mesa, AZ (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/273,971

(22) Filed: Oct. 18, 2002

(65) Prior Publication Data

US 2003/0030260 A1 Feb. 13, 2003

Related U.S. Application Data

(62) Division of application No. 09/371,776, filed on Aug. 10, 1999.

(51) Int. Cl.⁷ .............................................. B60R 21/26
(52) U.S. Cl. .................................... 280/741; 280/730.2
(58) Field of Search ................................. 280/741, 736, 280/737, 730.2, 730.1; 137/68.26, 68.23, 68.25, 68.28; 220/89.2

(56) References Cited

U.S. PATENT DOCUMENTS

| | | | |
|---|---|---|---|
| 3,648,898 A | 3/1972 | Day | |
| 3,804,435 A | * 4/1974 | See et al. .................... | 280/733 |
| 3,806,153 A | 4/1974 | Johnson | |
| 5,242,194 A | 9/1993 | Popek | |
| 5,263,740 A | 11/1993 | Frey et al. | |
| 5,468,015 A | 11/1995 | Goetz | |
| 5,536,040 A | 7/1996 | Cuevas et al. | |
| 5,564,740 A | 10/1996 | Zakula | |
| 5,573,271 A | 11/1996 | Headley | |
| 5,603,525 A | 2/1997 | Zakula | |
| 5,632,505 A | * 5/1997 | Saccone et al. .............. | 280/737 |
| 5,678,856 A | 10/1997 | Headley | |
| 5,826,904 A | * 10/1998 | Ellis et al. ................... | 280/737 |
| 5,863,066 A | 1/1999 | Blumenthal | |
| 5,907,120 A | 5/1999 | Mooney et al. | |
| 5,967,550 A | 10/1999 | Shirk et al. | |
| 5,984,348 A | 11/1999 | Specht et al. | |
| 6,010,152 A | 1/2000 | Swann et al. | |

(Continued)

FOREIGN PATENT DOCUMENTS

GB          2314300          12/1997

OTHER PUBLICATIONS

Co–pending U.S. Appl. No. 09/933,926, filed Aug. 21, 2001 entitled "Inflatable Seat Belt Using MEMS Devices".

Primary Examiner—David R. Dunn
(74) Attorney, Agent, or Firm—Tarolli, Sundheim, Covell & Tummino L.L.P.

(57) ABSTRACT

An inflator (22) for providing inflation fluid ( ) to inflate an inflatable vehicle occupant protection device (14) includes a container (30) storing the inflation fluid under pressure. The container (30) has an outlet passage (80) through which the inflation fluid flows from the container. A rupturable closure member (92) fixed to the container (30) blocks flow of inflation fluid through the passage (80). A support (100) for the rupturable closure member (92) defines a chamber (110) adjacent the rupturable closure member (92). The rupturable closure member (92) has a first portion (122) deformed into the chamber (110) by the pressure of the inflation fluid and a second ring-shaped portion (124) encircling the first portion (122). An initiator (98) ruptures the closure member (92) when actuated by shearing the first portion (122) from the second portion (124).

7 Claims, 4 Drawing Sheets

U.S. PATENT DOCUMENTS

| | | |
|---|---|---|
| 6,010,153 A | 1/2000 | Halas et al. |
| 6,029,995 A | 2/2000 | Fink |
| 6,056,316 A | 5/2000 | Yamaji et al. |
| 6,062,599 A | 5/2000 | Forbes et al. |
| 6,073,961 A | 6/2000 | Bailey et al. |
| 6,142,508 A | 11/2000 | Lewis |
| 6,145,876 A | 11/2000 | Hamilton |
| 6,206,420 B1 | 3/2001 | Skanborg et al. |
| 6,217,065 B1 | 4/2001 | Al-Amin et al. |
| 6,227,562 B1 | 5/2001 | Shirk et al. |
| 6,231,078 B1 | 5/2001 | Kokeguchi |
| 6,412,811 B1 * | 7/2002 | Campbell et al. ........ 280/730.2 |

* cited by examiner

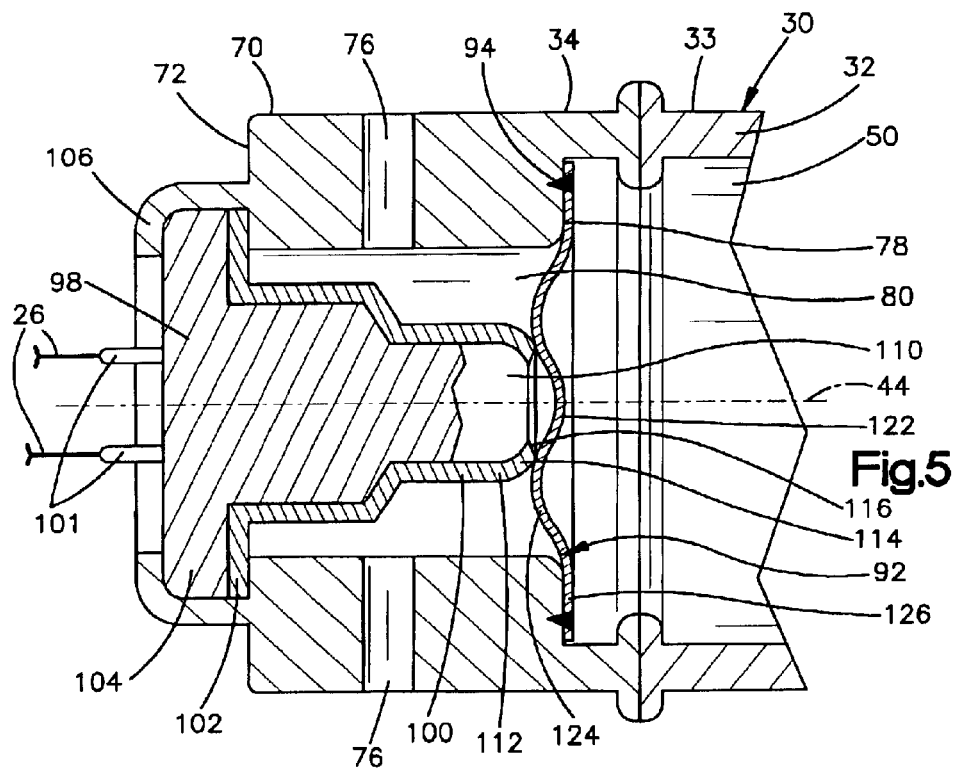
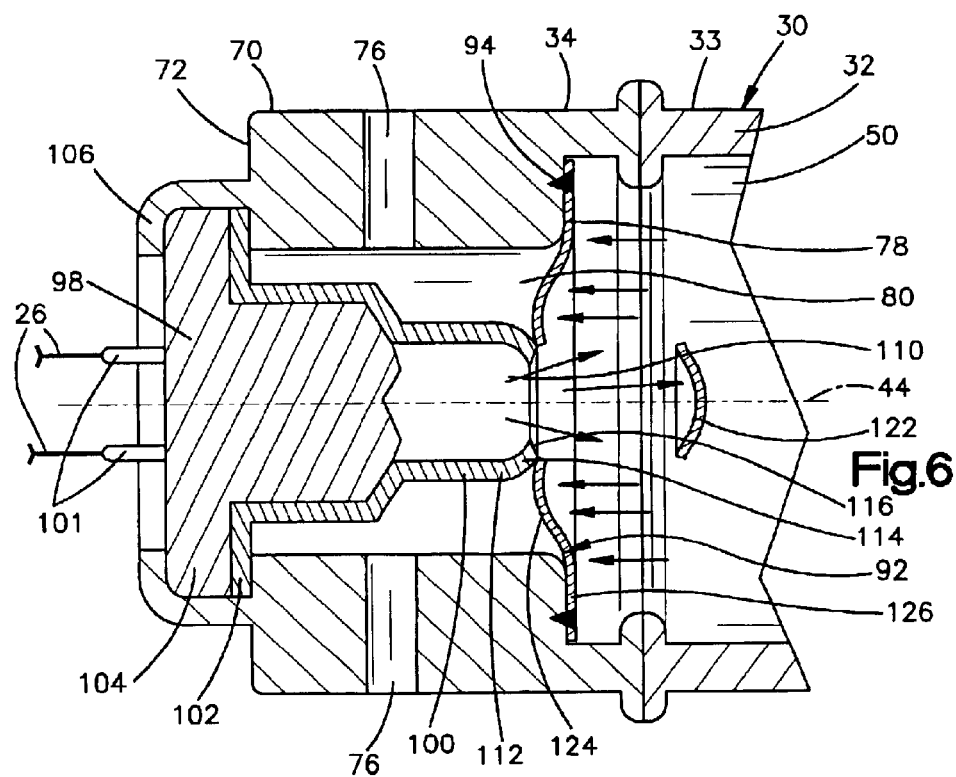

INFLATOR

RELATED APPLICATION

This application is a divisional of U.S. patent application Ser. No. 09/371,776, filed Aug. 10, 1999.

FIELD OF THE INVENTION

The present invention relates to an inflator which provides inflation fluid to inflate an inflatable vehicle occupant protection device and, more specifically, to an inflator in which a rupturable closure member is supported.

BACKGROUND OF THE INVENTION

An inflatable vehicle occupant protection device, such as a side curtain or an air bag, is inflated upon the occurrence of a vehicle condition requiring inflation of the side curtain or air bag. When inflation is required, an inflator is actuated to provide inflation fluid which inflates the side curtain or air bag into the vehicle occupant compartment.

The inflator includes a container defining an inflation fluid pressure chamber with an outlet passage. A rupturable closure member is fixed to the container to block flow of inflation fluid through the outlet passage. The inflator further includes an electrically actuatable initiator which, when actuated, causes the closure member to rupture so that inflation fluid in the pressure chamber can flow from the inflator.

SUMMARY OF THE INVENTION

The present invention is an inflator for providing inflation fluid to inflate an inflatable vehicle occupant protection device. The inflator includes a container storing inflation fluid under pressure. The container has an outlet passage through which inflation fluid flows from the container. A rupturable closure member fixed to the container blocks flow of inflation fluid through the outlet passage.

A support for the rupturable closure member defines a chamber adjacent the rupturable closure member. The rupturable closure member has a first portion deformed into the chamber by the pressure of the inflation fluid and a second ring-shaped portion encircling the first portion. An initiator ruptures the closure member by shearing the first portion from the second portion when actuated.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a view similar to FIG. 3 showing the closure member after an initiator of the inflator has been actuated;

FIG. 6 is a view similar to FIG. 5 showing a portion of the closure member sheared away.

DESCRIPTION OF A PREFERRED EMBODIMENT

Figure 1:
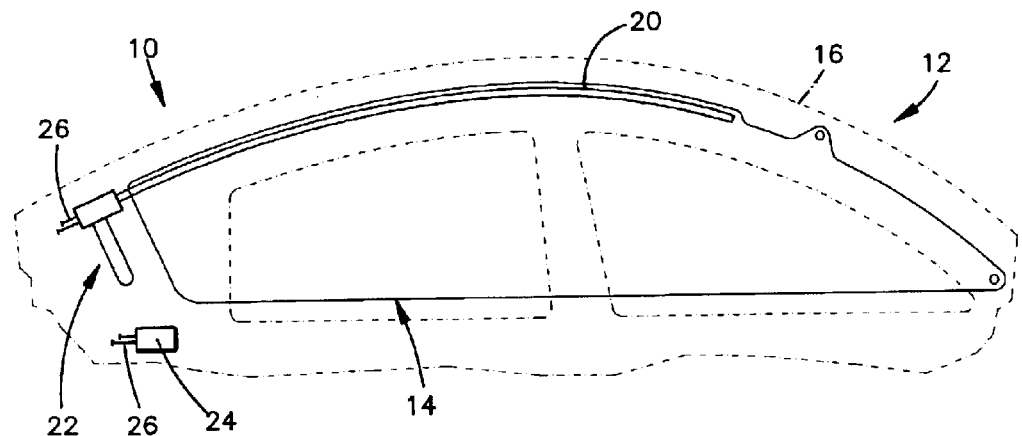
FIG. 1 is a schematic illustration of a vehicle safety apparatus embodying the present invention.

The present invention relates to a vehicle occupant safety apparatus. In particular, the present invention relates to an inflatable vehicle occupant protection device, such as a side curtain assembly, for helping to protect a vehicle occupant in the event of a side impact to a vehicle. As representative of the present invention, FIG. 1 illustrates schematically a vehicle safety apparatus 10 for helping to protect an occupant of a vehicle 12.

The safety apparatus 10 includes an inflatable vehicle occupant protection device in the form of a side curtain 14. The side curtain 14 is mounted adjacent the side structure 16 of the vehicle 12. A fill tube 20 extends into the side curtain 14. An actuatable inflator 22, when actuated, directs fluid into the fill tube 20 which, in turn, directs fluid into the inflatable side curtain 14 to inflate the side curtain. The side curtain 14 is inflated from a deflated and stowed condition (not shown) to an inflated condition, as illustrated in FIG. 1. In its inflated condition, the side curtain 14 is positioned between the side structure of the vehicle and a vehicle occupant. The side curtain 14 is made of a material having a low permeability so that the side curtain remains inflated for a long period of time, such as seven seconds or longer.

The vehicle 12 includes a sensor 24, known in the art, for sensing a side impact to the vehicle and/or a vehicle rollover, to actuate the inflator 22. The sensor 24 may include vehicle electric circuitry for actuating the inflator 22 in response to sensing a side impact to the vehicle and/or a vehicle rollover. The sensor 24 provides an electric signal over lead wires 26 to the inflator 22, when the inflator is to be actuated.

Figure 2:
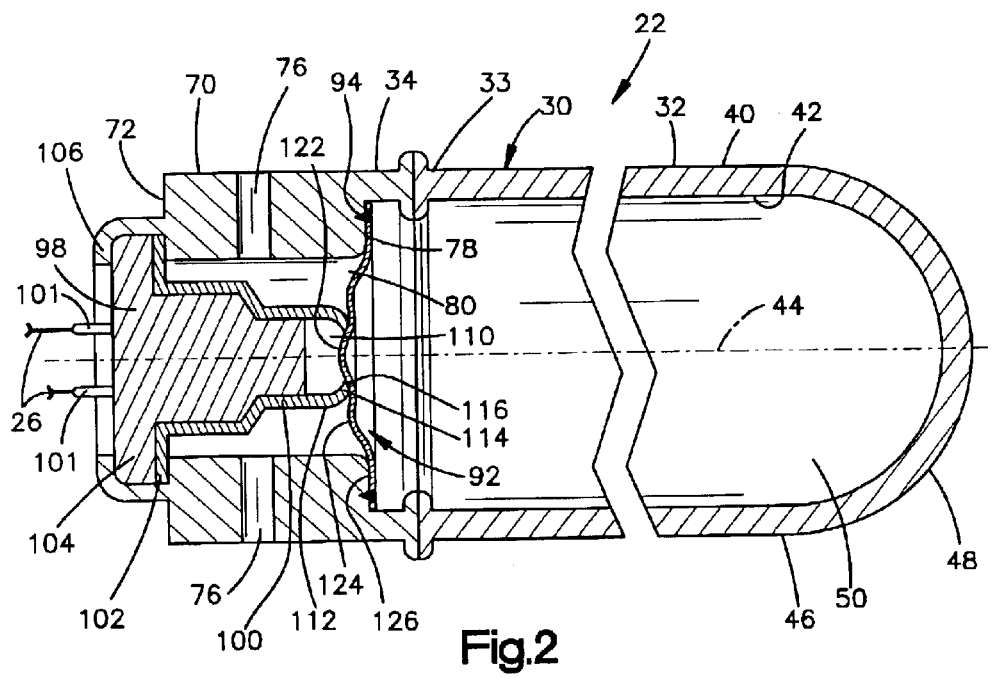
FIG. 2 is an enlarged sectional view of an inflator of the safety apparatus of FIG. 1.

The inflator 22 (FIG. 2) comprises a source of inflation fluid for the side curtain 14. The inflator 22 includes a container 30 having a generally elongate configuration including a main body portion 32 and an end cap 34. The end cap 34 is affixed to an open end 33 of the main body portion 32 by friction welding. The end cap 34 could, however, be connected to the main body portion 32 in any manner known in the art, such as using laser welds, brazing or screw threads.

The main body portion 32 of the container 30 has a tubular, cylindrical configuration including an axially extending cylindrical side wall 40. The side wall 40 has a cylindrical inner surface 42 centered on a longitudinal central axis 44 of the inflator 22. A second end portion 46 of the main body portion 32 is closed by a domed end wall 48. The side wall 40 and the end wall 48 define a chamber 50 in the container 30.

The chamber 50 contains pressurized inflation fluid. The inflation fluid stored in the chamber 50 preferably consists essentially of helium at a storage pressure within the range of about 4,000 psi to about 7,000 psi. The inflation fluid may, however, have any other composition and storage pressure suitable for inflating the side curtain 14.

Figure 3:
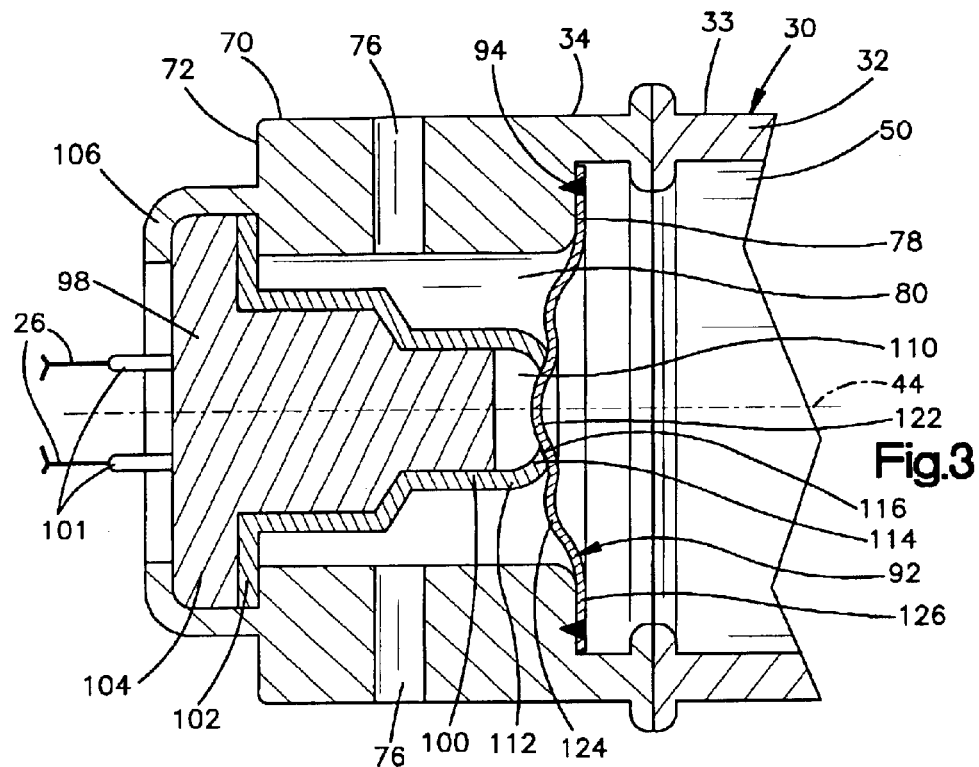
FIG. 3 is an enlarged view of a portion of the is inflator of FIG. 2.

The end cap 34 (FIGS. 2 and 3) of the container 30 has a generally cylindrical configuration including an axially extending cylindrical side wall 70 and an end surface 72. An annular array of inflation fluid outlet passages 76 are formed in the side wall 70 of the end cap 34. The flow area, number and/or configuration of the outlet passages 76 may be selected to restrict or otherwise control the flow of inflation fluid into the side curtain 14 through the fill tube 20, which is connected in a known manner to the end cap 34, as illustrated schematically in FIG. 1.

The end cap 34 includes a surface 78 (FIG. 2) which extends generally parallel to the end surface 72. A passage 80 extends axially through the end cap 34 and intersects the surface 78. The passage 80 conducts inflation fluid from the chamber 50 to the outlet passages 76. The passage 80 is centered on the axis 44.

A rupturable closure member 92 (FIGS. 2 and 3), such as a rupture disk, is affixed to the surface 78 by a laser weld 94. The rupture disk 92 could, however, be connected to the surface 78 in any manner well known in the art, such as by brazing, projection welding or electron beam welding. The rupture disk 92 is centered on the axis 44 and blocks the flow of inflation fluid through the passage 80 and to the passages 76.

An initiator 98 centered on the axis 44 is housed in a hollow support 100 which supports the closure member 92. Lead wires 26 extend from connector pins 101 of the initiator 98 to receive the electrical signal from the sensor 24. The support 100 is centered on the axis 44. The support 100 (FIGS. 2 and 3) has a flange 102 which engages the end surface 72 of the end cap 34. The flange 102 extends radially outward of the support 100 and also engages a radially extending base 104 of the initiator 98.

An annular rim portion 106 extends from the end surface 72. The rim portion 106 initially projects axially away from the end surface 72 and is subsequently crimped around the base 104 of the initiator 98 to hold the initiator and the support 100 in place in the end cap 34. Alternatively, the initiator 98 and the support 100 may be welded to the end cap 34 to retain the initiator and the support in the end cap.

The support 100 projects inwardly along the axis 44 into abutment with the closure member 92. The support 100 is thus mounted in a load bearing relationship with the closure member 92. More specifically, the closure member 92 is subjected to the storage pressure of the inflation fluid in the chamber 50. Therefore, the closure member 92 transmits a fluid storage pressure force axially outward against the support 100. The support 100, in turn, transmits the storage pressure force to the end surface 72 of the end cap 34 where the initiator 98 adjoins the crimped rim 106 of the end surface 72.

The support 100 defines a chamber 110. An end portion 112 of the support 100 has a circular rim 114 engaging the closure member 92. The rim 114 defines an opening 116 into the chamber 110.

The closure member 92 has a central dome-shaped portion 122 extending into the chamber 110. A portion 124 of the closure member 92 encircles the dome-shaped portion 122. The portion 124 of the closure member 92 extends from the circular rim 114 of the support 100 to the surface 78 of the end cap 34. A portion 126 of the closure member 92 encircles the portion 124 and is welded to the surface 78.

Figure 4:
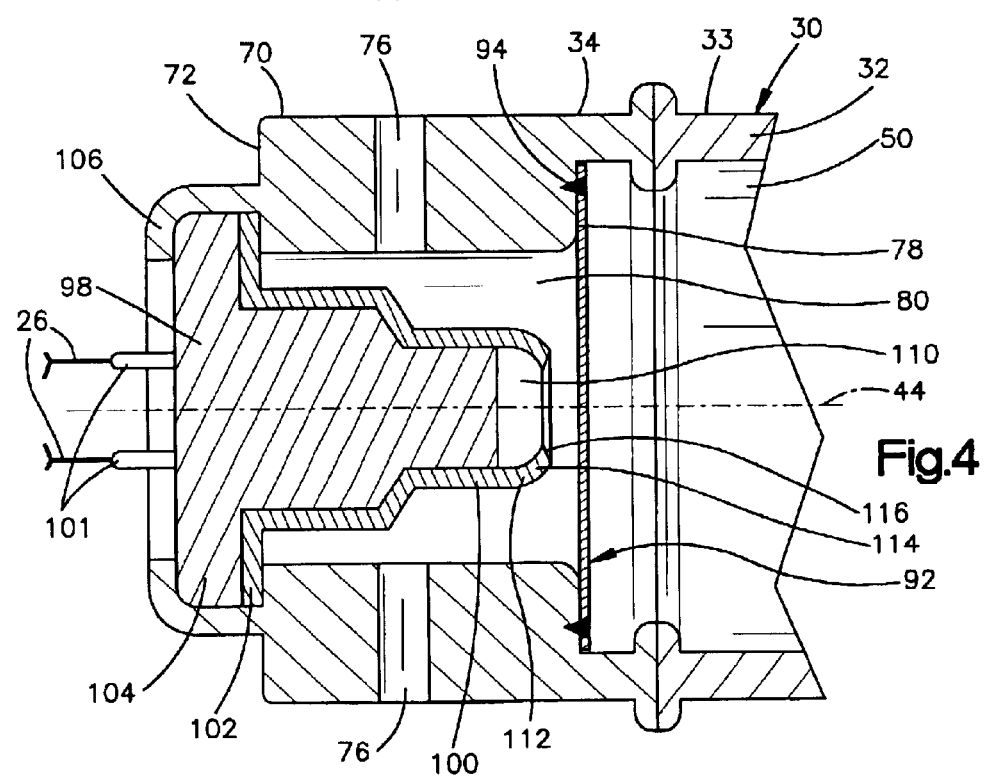
FIG. 4 is a view similar to FIG. 3 showing a rupturable closure member prior to inflation fluid entering a container which is closed by the closure member.

When the chamber 50 is not filled with inflation fluid, as shown in FIG. 4, the closure member 92 is a flat disk. The closure member 92 is spaced from the rim 114 of the support 100. During the subsequent loading of the closure member 92 by the pressure of the inflation fluid, the closure member is stressed and undergoes plastic deformation into the chamber 110. The closure member 92 deforms from the flat disk shown in FIG. 4 into the shape shown in FIG. 3. A work hardening of the closure member 92 occurs during the plastic deformation.

Upon receiving of an electric signal from the sensor 24, the initiator 98 is actuated in a known manner to produce a shock wave and combustion gas. The pressure of the combustion gas, coupled with the shock wave, acts on the dome-shaped portion 122 of the closure member 92 to reverse the dome from the position shown in FIG. 3 to the position shown in FIG. 5.

Figure 7:
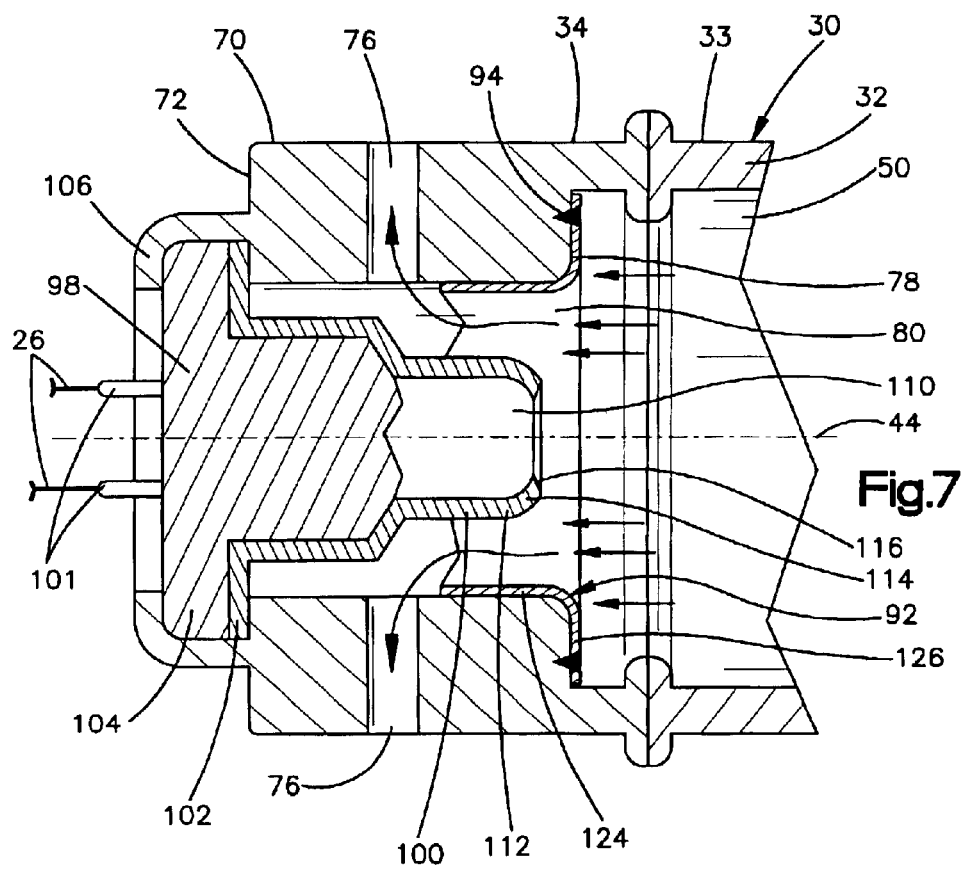
FIG. 7 is a view similar to FIG. 6 showing the closure member during flow of inflation fluid from the container.

The large movement of the dome 122 shears the dome out of the closure member 92, as shown in FIG. 6. The portion 124 of the closure member 92 continues to block the passage 80. The pressure generated by the inflation fluid is supported only by the strength of the portion 124 when the dome 122 is removed. The pressure of the inflation fluid causes the portion 124 of the closure member 92 to rip and petal away from the support 100 to the position shown in FIG. 7, providing a flow of the inflation fluid through the passage 80 and to the outlet passages 76 and thereafter to the side curtain 14.

From the above description of the invention, those skilled in the art will perceive improvements, changes and modifications. For example, although the inflator 22 is shown being used with a side curtain 14, the inflator could be used in any known inflatable vehicle occupant protection device such as air bags, inflatable seat belts, inflatable knee bolsters, inflatable air bags to operate knee bolsters, and inflatable head liners. Such improvements, changes and modifications within the skill of the art are intended to be covered by the appended claims.

Having described the invention, the following is claimed:

1. Apparatus for helping to protect an occupant of a vehicle including a side structure, said apparatus comprising:
   an inflatable vehicle occupant protection device inflatable to an inflated condition for helping to protect the occupant of the vehicle, said inflatable vehicle occupant protection device when in said inflated condition being positioned between the side structure of the vehicle and the vehicle occupant; and
   an inflator actuatable to provide inflation fluid for inflating said inflatable vehicle occupant protection device, said inflator comprising:
   a single container for storing inflation fluid under pressure, said inflator being free from any other means for storing inflation fluid under pressure, said pressure being at least 4,000 psi, said inflation fluid stored in said single container being sufficient to inflate said inflatable vehicle occupant protection device to said inflated condition, said inflatable vehicle occupant protection device once in said inflated condition remaining in said inflated condition for at least seven seconds;
   passage means for discharging said inflation fluid from said single container, said passage means including only passage means having a fixed flow area, said inflator being free from any other means through which inflation fluid is discharged from said inflator upon actuation of said inflator; and
   an initiator actuatable to cause said inflator to discharge said inflation fluid through said passage means toward said inflatable vehicle occupant protection device to inflate said inflatable vehicle occupant protection device to said inflated condition.

2. The apparatus recited in claim 1, further comprising a fill tube having a portion located in said inflatable vehicle occupant protection device, said fill tube delivering said inflation fluid discharged from said inflator into said inflatable vehicle occupant protection device to inflate said inflatable vehicle occupant protection device.

3. The apparatus recited in claim 1, wherein said inflation fluid flows through said passage means from said container toward said inflatable vehicle occupant protection device, said apparatus further comprising a rupturable closure member fixed to said container and blocking flow of said inflation fluid through said passage means, said initiator, when actuated, causing said closure member to rupture to allow said inflation fluid to flow through said passage means.

4. The apparatus recited in claim 3, further comprising a support for supporting said closure member against the pressure of said inflation fluid in said container, said initiator, when actuated, causing said closure member to rupture under the pressure of said inflation fluid and permit flow of inflation fluid from said container through said passage means.

5. The apparatus recited in claim 1, wherein said pressure is 5,000–7,000 psi.

6. Apparatus for helping to protect an occupant of a vehicle including a side structure, said apparatus comprising:

an inflatable vehicle occupant protection device inflatable to an inflated condition for helping to protect the occupant of the vehicle, said inflatable vehicle occupant protection device when in said inflated condition being positioned between the side structure of the vehicle and the vehicle occupant;

a single container for storing inflation fluid under pressure, said apparatus being free from any other means for storing inflation fluid under pressure, said pressure being at least 4,000 psi, said inflation fluid stored in said single container being sufficient to inflate said inflatable vehicle occupant protection device to said inflated condition, said inflatable vehicle occupant protection device once in said inflated condition remaining in said inflated condition for at least seven seconds;

passage means for discharging said inflation fluid from said container, said passage means including only passage means having a fixed flow area, said apparatus being free from any other means through which inflation fluid is discharged; and an initiator actuatable to effectuate discharge of said inflation fluid through said passage means toward said inflatable vehicle occupant protection device to inflate said inflatable vehicle occupant protection device to said inflated condition.

7. The apparatus recited in claim 6, wherein said pressure is 5,000–7,000 psi.

* * * * *